US011962162B2

(12) United States Patent
Cloyd et al.

(10) Patent No.: US 11,962,162 B2
(45) Date of Patent: Apr. 16, 2024

(54) ACCESSORY DEVICE FOR ELECTRONIC DEVICES

(71) Applicant: Apple Inc., Cupertino, CA (US)

(72) Inventors: Bryan A. Cloyd, San Francisco, CA (US); Linda D. Benavente-Notaro, Sherman Oaks, CA (US); Chengrui Zhang, Milpitas, CA (US); Sara Rusignuolo, Newport Beach, CA (US)

(73) Assignee: Apple, Inc., Cupertino, CA (US)

( * ) Notice: Subject to any disclaimer, the term of this patent is extended or adjusted under 35 U.S.C. 154(b) by 675 days.

(21) Appl. No.: 17/147,315

(22) Filed: Jan. 12, 2021

(65) Prior Publication Data

US 2022/0094204 A1 Mar. 24, 2022

Related U.S. Application Data

(60) Provisional application No. 63/081,842, filed on Sep. 22, 2020.

(51) Int. Cl.
| | |
|---|---|
| *G06F 1/16* | (2006.01) |
| *A45C 11/18* | (2006.01) |
| *A45C 13/30* | (2006.01) |
| *H02J 50/10* | (2016.01) |
| *H05K 5/00* | (2006.01) |
| *H05K 7/00* | (2006.01) |

(52) U.S. Cl.
CPC .......... *H02J 50/10* (2016.02); *A45C 11/182* (2013.01); *A45C 13/30* (2013.01); *A45C 2013/306* (2013.01); *A45F 2200/0516* (2013.01); *A45F 2200/0525* (2013.01)

(58) Field of Classification Search
CPC ........ H02J 50/10; A45C 11/182; A45C 13/30; A45C 13/306
See application file for complete search history.

(56) References Cited

U.S. PATENT DOCUMENTS

| | | | |
|---|---|---|---|
| 9,829,941 B1 | 11/2017 | Saeidi et al. | |
| 10,838,462 B1 | 11/2020 | Monaco et al. | |
| 10,892,625 B1* | 1/2021 | Franklin | A45C 15/00 |
| 2011/0301778 A1 | 12/2011 | Liang et al. | |
| 2013/0082532 A1 | 4/2013 | Rich et al. | |

(Continued)

*Primary Examiner* — Anthony M Haughton
(74) *Attorney, Agent, or Firm* — BAKERHOSTETLER

(57) ABSTRACT

An accessory device is disclosed. The accessory device may include multiple pockets, or sleeves, designed to carry items, such as an electronic device and a user's personal items (e.g., credits cards, cash, etc.). The accessory device also includes a magnet embedded in a back section, with the magnet designed to align an inductive charging mechanism that can charge the electronic device's battery when the electronic device is positioned within the accessory device. To improve charging efficiency, the back section also includes a structural layer designed to keep the back section flat when the electronic device is positioned within the accessory device. The structural layer can hide/obscure the magnet and other structures. Also, the accessory device includes a wireless communication circuit that can communicate with a corresponding wireless communication circuit in the electronic device, and provide information (e.g., openings and dimensional information of the accessory device) to the electronic device.

20 Claims, 14 Drawing Sheets

(56) References Cited

U.S. PATENT DOCUMENTS

| | | | |
|---|---|---|---|
| 2013/0148839 A1* | 6/2013 | Stevinson | H04R 1/1033 |
| | | | 381/384 |
| 2014/0085815 A1* | 3/2014 | Filipovic | G06F 1/163 |
| | | | 361/679.56 |
| 2014/0128132 A1* | 5/2014 | Cox, III | H04B 1/3888 |
| | | | 455/575.8 |
| 2014/0218305 A1* | 8/2014 | Beasley | H04M 1/04 |
| | | | 345/169 |
| 2014/0221057 A1 | 8/2014 | Katis et al. | |
| 2014/0236380 A1 | 8/2014 | Alton et al. | |
| 2014/0362518 A1 | 12/2014 | Huang et al. | |
| 2015/0043156 A1 | 2/2015 | Jain et al. | |
| 2015/0057830 A1 | 2/2015 | Slaby et al. | |
| 2015/0201723 A1 | 7/2015 | Rayner et al. | |
| 2017/0026498 A1* | 1/2017 | Goldfain | H02J 7/342 |
| 2017/0080251 A1 | 3/2017 | Yehezkel | |
| 2018/0020812 A1* | 1/2018 | Rao | A45C 13/18 |
| | | | 320/137 |
| 2018/0176748 A1 | 6/2018 | Kim et al. | |
| 2020/0313712 A1 | 10/2020 | Schooley et al. | |

\* cited by examiner

ACCESSORY DEVICE FOR ELECTRONIC DEVICES

CROSS-REFERENCE TO RELATED APPLICATIONS

The present application claims the benefit of U.S. Provisional Application No. 63/081,842, entitled "ACCESSORY DEVICE FOR ELECTRONIC DEVICES," filed Sep. 22, 2020, the content of which is incorporated herein by reference in its entirety for all purposes.

FIELD

The following description relates to accessory devices. In particular, the following description relates to an accessory for carrying a portable electronic device as well as other personal items (e.g., credit cards). When the accessory device carries the electronic device, the accessory device can communicate with the electronic device, allowing the electronic device to adjust display features in accordance with features of the accessory device. The accessory device can also promote wireless charging of the electronic device, while hiding/obscuring the structural features (e.g., magnets, structural layers) used to enhance wireless charging efficiency.

BACKGROUND

Accessory devices can be used to hold/carry electronic devices. Accessory devices can come in a variety of colors and materials to suit user preferences.

SUMMARY

In one aspect, an accessory device for a portable electronic device is described. The accessory device may include a first section that includes an opening. The accessory device may further include a second section coupled with the first section. The first section and the second section may define a first pocket. The accessory device may further include a third section coupled with the second section. The second section and the third section may define a second pocket configured to receive the portable electronic device. The accessory device may further include a wireless communication circuit configured to send information to the portable electronic device when the portable electronic device is disposed in the second pocket. The information may correspond to the opening, such as a size, shape, and/or location of the opening in the first section.

In another aspect, an accessory device for a portable electronic device is described. The accessory device may include a first section that includes an opening. The accessory device may further include a second section covered by the first section. The first section and the second section may define a first pocket. The accessory device may further include a third section covered by the second section. The second section and the third section may define a second pocket configured to receive the portable electronic device. The second pocket can be separate from the first pocket. The third section may include a magnet configured to magnetically couple with and align an inductive charging unit that charges the portable electronic device when the portable electronic device is disposed in the second pocket. The third section may further include a wireless communication circuit configured to send information to the portable electronic device. The information may include a location of the opening.

In another aspect, an accessory device for a portable electronic device is described. The accessory device may include a first section that includes an opening. The accessory device may further include an adhesive layer. The accessory device may further include a second section coupled with the first section by the adhesive layer. The first section, the second section, and the adhesive layer may define a first pocket. The accessory device may further include a third section covered by the second section. The second section and the third section may define a second pocket configured to receive the portable electronic device. The third section may include a capping layer. The third section may further include a structural layer coupled with the capping layer. In some embodiments, the third section maintains a planar section, based on the capping layer and the structural layer, when the portable electronic device is located in the second pocket.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
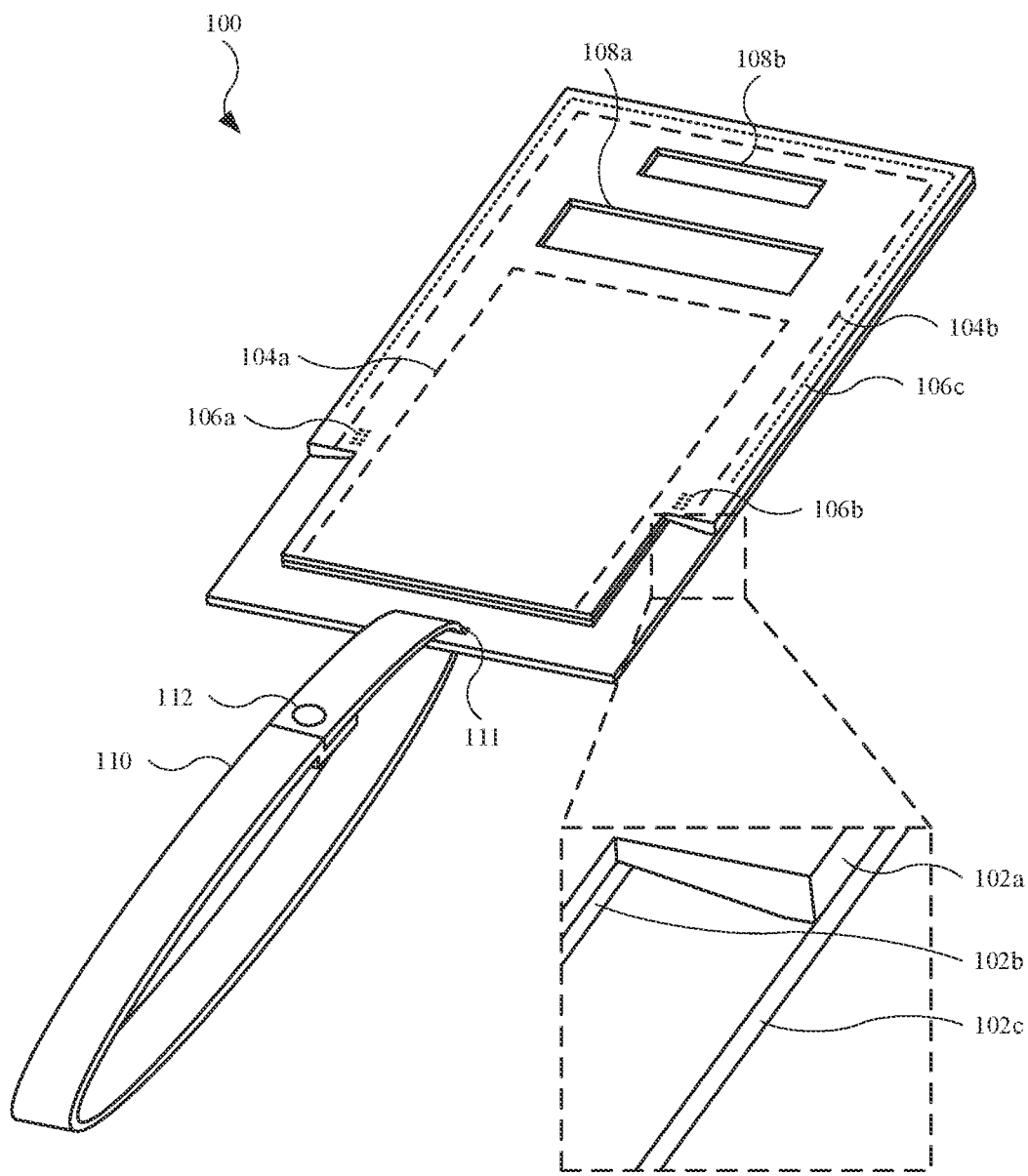
FIG. 1 illustrates a front isometric view of an embodiment of an accessory device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices for use with portable electronic devices, including mobile wireless communication devices (e.g., smartphones, tablet computing devices). Accessory devices described herein include multiple pockets, or openings, one of which is designed to receive a portable electronic device, while another is designed to receive, for example, a user's personal items such as credit cards and cash. Accessory devices described herein may come in a variety of sizes, with pockets having sizes and shapes corresponding to those of the portable electronic device and the personal items.

Additionally, accessory devices described herein are designed to communicate information to the portable electronic device. In this regard, the accessory device includes wireless communication circuitry (e.g., near-field communication, or NFC, circuitry) that can communicate with similar circuitry in the portable electronic device. The communication may occur when the portable electronic device and the accessory device are in relatively close proximity to each other, including when the portable electronic device is positioned in the accessory device. In some exemplary embodiments, the wireless communication circuitry of the accessory device can provide information related to the accessory device. The information can be used by the portable electronic device to identify the accessory device and some of its features, such as a location of an opening (or openings) in a section of the accessory device. As a result, the portable electronic device can present, on a display, visual information on the display at a location corresponding to the opening such that the visual information is viewable through the opening. In addition, once the accessory device is known, the portable electronic device may also receive information related to the thickness and material makeup of the accessory device. In this manner, a portable electronic device having wireless (inductive) charging capabilities can more accurately and reliably determining charging characteristics, such as the time required to charge an internal battery of the portable electronic device, as the portable electronic device can account for the thickness and material makeup through which a magnetic field from an (external) inductive charging mechanism will pass to induce a current and charge the internal battery.

Traditional accessory devices are generally not modified to enable, or at least promote, efficient wireless charging when a portable electronic device is positioned therein. However, accessory devices described herein may include a structural layer, or stiffening layer, that includes one or more relatively rigid layers designed to promote a flat, or planar, back section of the accessory device. As a result, a portable electronic device disposed in the accessory device can be more efficiently charged by an external wireless charging mechanism through the back section of the accessory device, as opposed to an accessory device with that back section that is bowed or otherwise curved (i.e., not flat) due to the insertion of the portable electronic device. In order to further promote/enable wireless charging, the back section of the accessory device may include a magnet designed to magnetically couple with the external wireless charging mechanism. The magnet not only provides an alignment between an inductive transmitting coil of the external wireless charging mechanism and an inductive transmitting coil of the portable electronic device, but also maintains the external wireless charging mechanism against the back section of the accessory device, thereby increasing the charging efficiency. Moreover, in order to hide or obscure the magnet, the magnet may be embedded in the structural layer. As a result, at least some of the features and complexities are not viewable by the user of the accessory device, which can enhance the overall aesthetic appearance of the accessory device.

These and other embodiments are discussed below with reference to FIGS. 1-18. However, those skilled in the art will readily appreciate that the detailed description given herein with respect to these Figures is for explanatory purposes only and should not be construed as limiting.

FIG. 1 illustrates a front isometric view of an embodiment of an accessory device 100. Accessory device 100 is designed to carry and support portable electronic devices, including smartphones and tablet computing devices, as non-limiting examples. Additionally, accessory device 100 is designed to carry/hold a user's personal items, such as credit cards, hotel cards, cash, etc., as non-limiting examples. In this regard, accessory device 100 may include multiple sections coupled together. For example, as shown in the enlarged view, accessory device 100 includes a section 102*a*, a section 102*b*, and a section 102*c*. Sections 102*a*, 102*b*, and 102*c* may be referred to as a first section, a second section, and a third section, respectively. Additionally, sections 102a and 102c may be referred to as a front (or top) section and back (or rear or bottom) section, respectively, while section 102b may be referred to as a middle section. Sections 102a, 102b, and 102c define pockets (or sleeves or cavities) for a user's personal items. For example, sections 102a and 102b define a pocket 104a for a user's credit cards, cash, etc., while sections 102b and 102c define a pocket 104b for a portable electronic device. Pockets 104a and 104b are shown as dotted lines, and will be further shown and described below. The defined areas for pockets 104a and 104b may be at least partially obscured. However, as shown, pocket 104a may be defined in part by stitching 106a and stitching 106b, which may couple sections 102a and 102b together, and pocket 104b may be defined in part by stitching 106c, which may couple sections 102a and 102c together. Several adhesive layers (not shown in FIG. 1) may also define the size and shape of pockets 104a and 104b.

Although a portable electronic device (not shown in FIG. 1) may be substantially covered by accessory device 100 when the portable electronic device is inserted into pocket 104b, accessory device 100 is nonetheless designed to promote user interaction with the portable electronic device. For example, section 102a may include an opening 108a and an opening 108b. In some embodiments, opening 108a renders a region of a display of the portable electronic device at least partially visible, and as a result, the display can present visual information viewable through opening 108a. This will be shown and described in further detail below. In some embodiments, opening 108b renders input and output mechanisms (e.g., camera(s), sensor(s), and/or audio speaker(s)) of the portable electronic device unobscured/unobstructed, and as a result, the portable electronic device can use the input and output mechanisms based on the opening 108b while being positioned in accessory device 100.

Also, a strap 110 may extend from accessory device 100. Strap 110 is sized and shaped to fit around a user's appendage (e.g., wrist or forearm) thus providing another means for carrying accessory device 100 by the user. In some embodiments, strap 110 is permanently coupled with accessory device 100. In the embodiment shown in FIG. 1, strap 110 passes through an opening 111 in section 102c, and can be removed from accessory device 100 by interacting with a button 112. Although not shown, section 102a may further include cosmetic enhancements, such as paint or ink (as non-limiting examples), located around openings 108a and 108b, as well as other locations. These cosmetic enhancements may also be applied to a perimeter of sections 102b and 102c.

Figure 2:
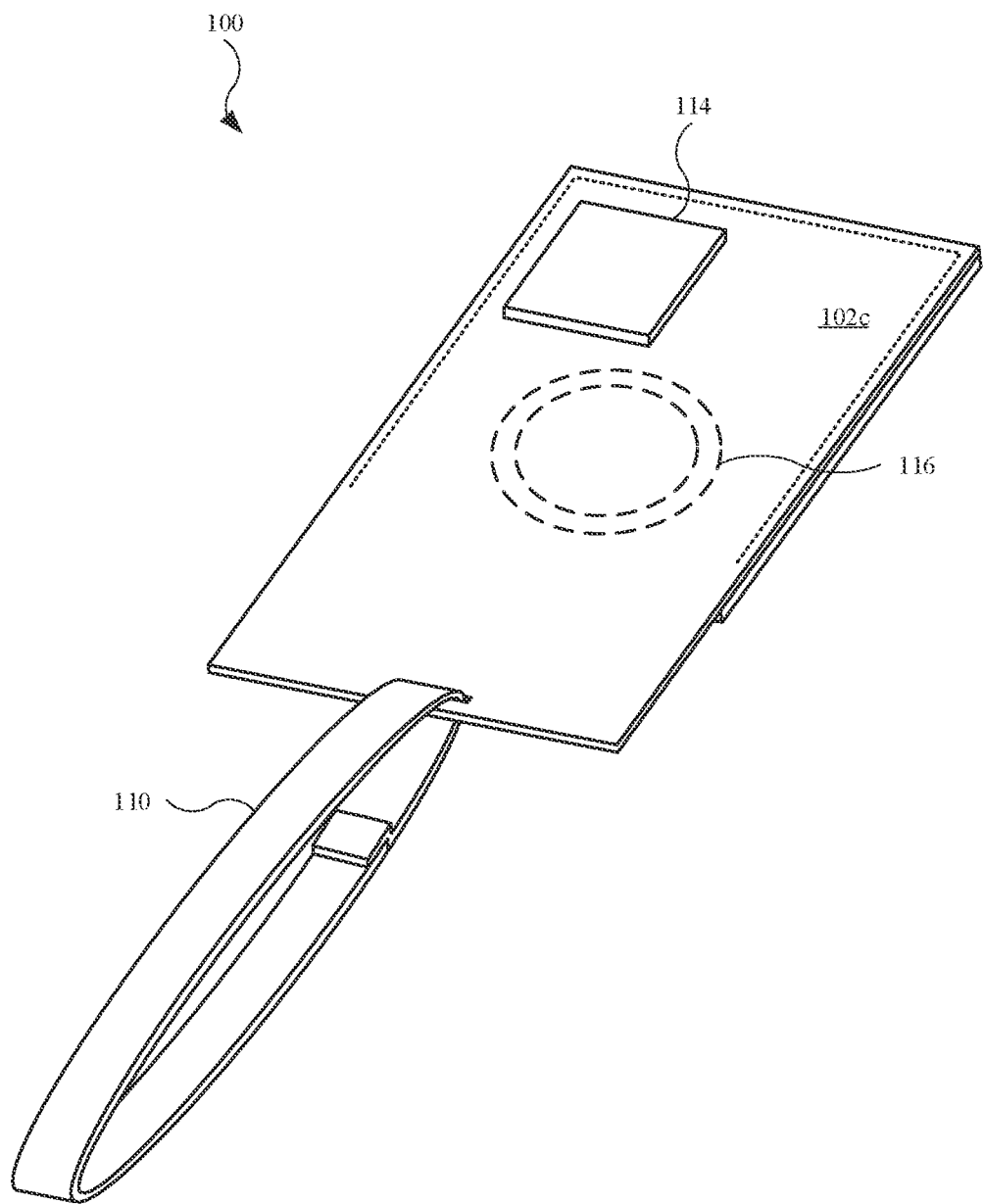
FIG. 2 illustrates a rear isometric view of the accessory device shown in FIG. 1, showing additional features of the accessory device.

FIG. 2 illustrates a rear isometric view of accessory device 100 shown in FIG. 1, showing additional features of accessory device 100. As shown, section 102c may include a protrusion 114 (or recess when viewed, for example, in FIG. 1) that extends from a surface of section 102c. Protrusion 114 is designed to accommodate a camera assembly of the portable electronic device. In this manner, section 102c may remain flat or planar (or at least substantially flat or planar) when accessory device 100 receives the portable electronic device. Additional features in section 102c may also promote a flat/planar surface of section 102c, thereby maintaining the section 102c as a planar section. This will be discussed below.

Section 102c may further include a magnet 116. In some embodiments, magnet 116 can magnetically couple with an external accessory suitable for use with the portable electronic device (when the portable electronic device is disposed in accessory device 100). For example, magnet 116 can be designed to magnetically couple with a wireless (inductive) charging mechanism that can inductively charge a battery of the portable electronic device, even when the portable electronic device is disposed in accessory device 100. Moreover, magnet 116 is positioned in section 102c in a location corresponding to that of the wireless (inductive) receiving coil of the portable electronic device (when the portable electronic device is disposed in accessory device 100). As shown, magnet 116 includes a circular magnet. However, other shapes are possible.

Also, in some embodiments, magnet 116 is a flexible magnet formed from a relatively thin magnetic element, or a combination of several (modular) magnetic elements.

Figure 3:
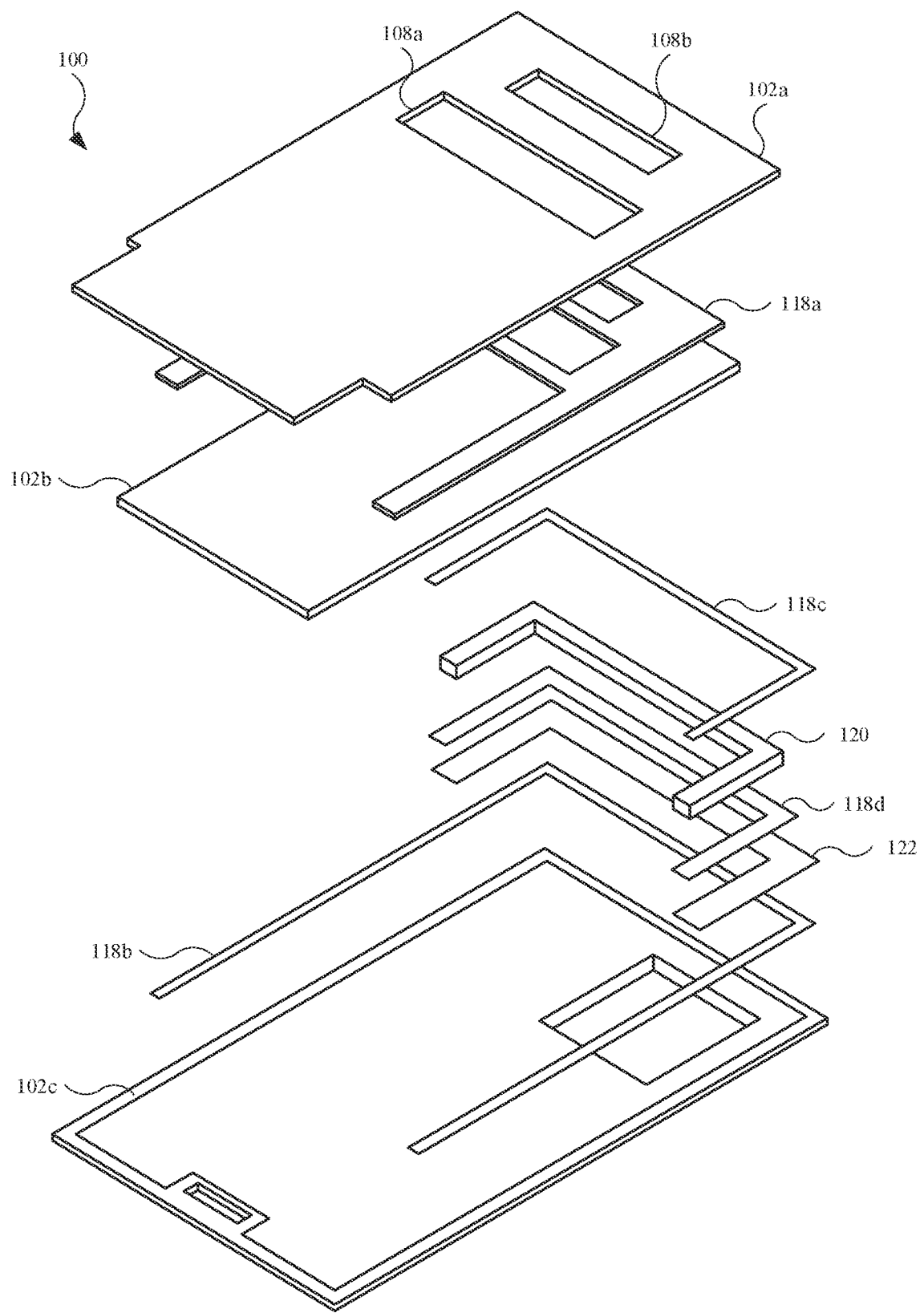
FIG. 3 illustrates an exploded view of the accessory device, showing the sections of the accessory device as well as additional features of the accessory device.

FIG. 3 illustrates an exploded view of accessory device 100, showing sections 102a, 102b, and 102c, as well as additional features of accessory device 100. When accessory device 100 is assembled, section 102a is stacked over section 102b, and section 102b is stacked over section 102c. In addition to stitching (shown in FIG. 1), sections 102a, 102b, and 102c are held together by additional materials. For example, accessory device 100 includes an adhesive layer 118a that adhesively secures regions of sections 102a and 102b together. Adhesive layer 118a may include openings (not fully shown) that include a size, shape, and corresponding location as those of openings 108a and 108b such that adhesive layer 118a does not obstruct openings 108a and 108b. Moreover, adhesive layer 118a may define in part pocket 104a (shown in FIG. 1). Additionally, accessory device 100 includes an adhesive layer 118b that adhesively secures regions of sections 102a and 102c together.

While sections 102b and 102c define a pocket (not shown in FIG. 3) for a portable electronic device, accessory device 100 may include additional structural elements designed to align the portable electronic device. For example, accessory device 100 may include a collar 120, or alignment structure, designed to align the portable electronic device. Collar 120 defines a three-dimensional structure designed to wrap around and engage multiple sides of the portable electronic device. In this regard, collar 120 is designed to align the portable electronic device such that the aforementioned visual information presented on the display of the portable electronic device is consistently aligned with opening 108a in section 102a, and also the input and output mechanisms of the portable electronic device are consistently aligned with opening 108b in section 102a. Collar 120 may include a polymer material (as a non-limiting example). Generally, collar 120 may include any material that is durable enough to resist some compression forces provided by the portable electronic device, while also not damaging the portable electronic device.

In order to secure collar 120, accessory device 100 may include an adhesive layer 118c designed to adhesively secure collar 120 with section 102b. Accessory device 100 may further include an adhesive layer 118d designed to adhesively secure collar 120 with a structural layer 122. Structural layer 122 may include a woven fabric, such as taffeta (as a non-limiting example).

Figure 4:
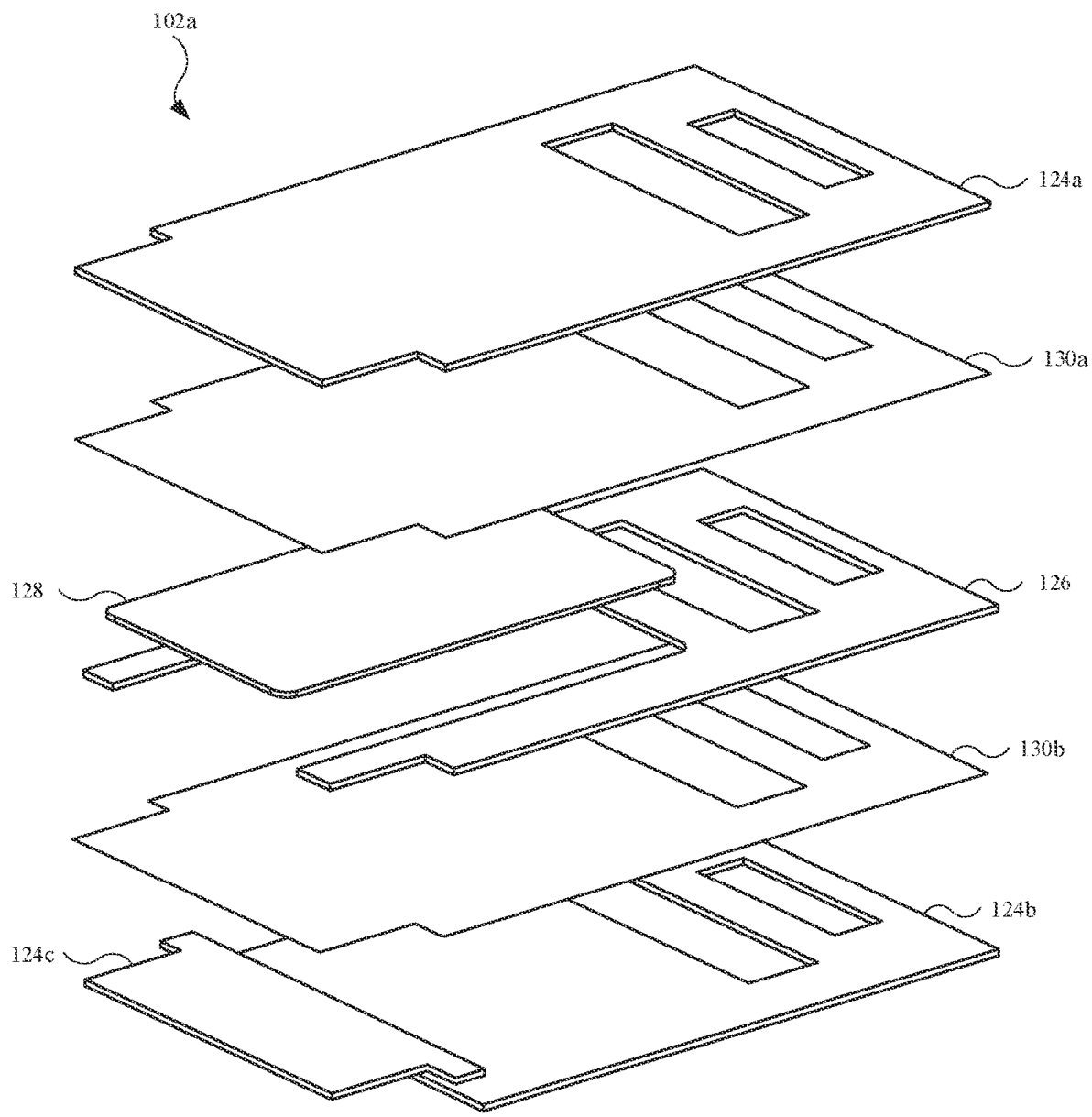
FIG. 4 illustrates an exploded view of the section (i.e., top section) of the accessory device, showing several features of the section.

FIG. 4 illustrates an exploded view of section 102a of accessory device 100, showing several features of section 102a. As shown, section 102a includes a layer 124a, a layer 124b, and a layer 124c. Layers 124a, 124b, and 124c generally define the exterior of section 102a. Layers 124a, 124b, 124c may include aesthetic materials, such as leather, synthetic leather, or microfiber (as non-limiting layers). In some embodiments, layers 124a and 124c include leather and layer 124b includes microfiber.

Section 102a may also include relatively rigid layers, as compared to layers 124a, 124c, and 124c. For example, section 102a may include a structural layer 126, or filler, designed to provide structural support. Structural layer 126 may include a flexible but durable material, such as thermoplastic polyurethane ("TPU"), as a non-limiting example. Further, section 102a may include a shunt 128 formed from a metal or other material designed to absorb a magnetic field generated from, for example, a magnet external to accessory device 100 (shown in FIG. 1). As a result, shunt 128 can protect personal items, such as credit cards and hotel cards, from damage. As shown, structural layer 126 includes a cut out (not labeled) with a size and shape corresponding to that of shunt 128. In this manner, structural layer 126 and shunt 128 may be co-planar when assembled. In order to secure structural layer 126 and shunt 128, section 102a includes an adhesive layer 130a to secure structural layer 126 and shunt 128 to layer 124a, and an adhesive layer 130b to secure structural layer 126 and shunt 128 to layers 124b and 124c. It should be noted that several layers include openings, and thus define, in part, openings 108a and 108b (shown in FIG. 1).

Figure 5:
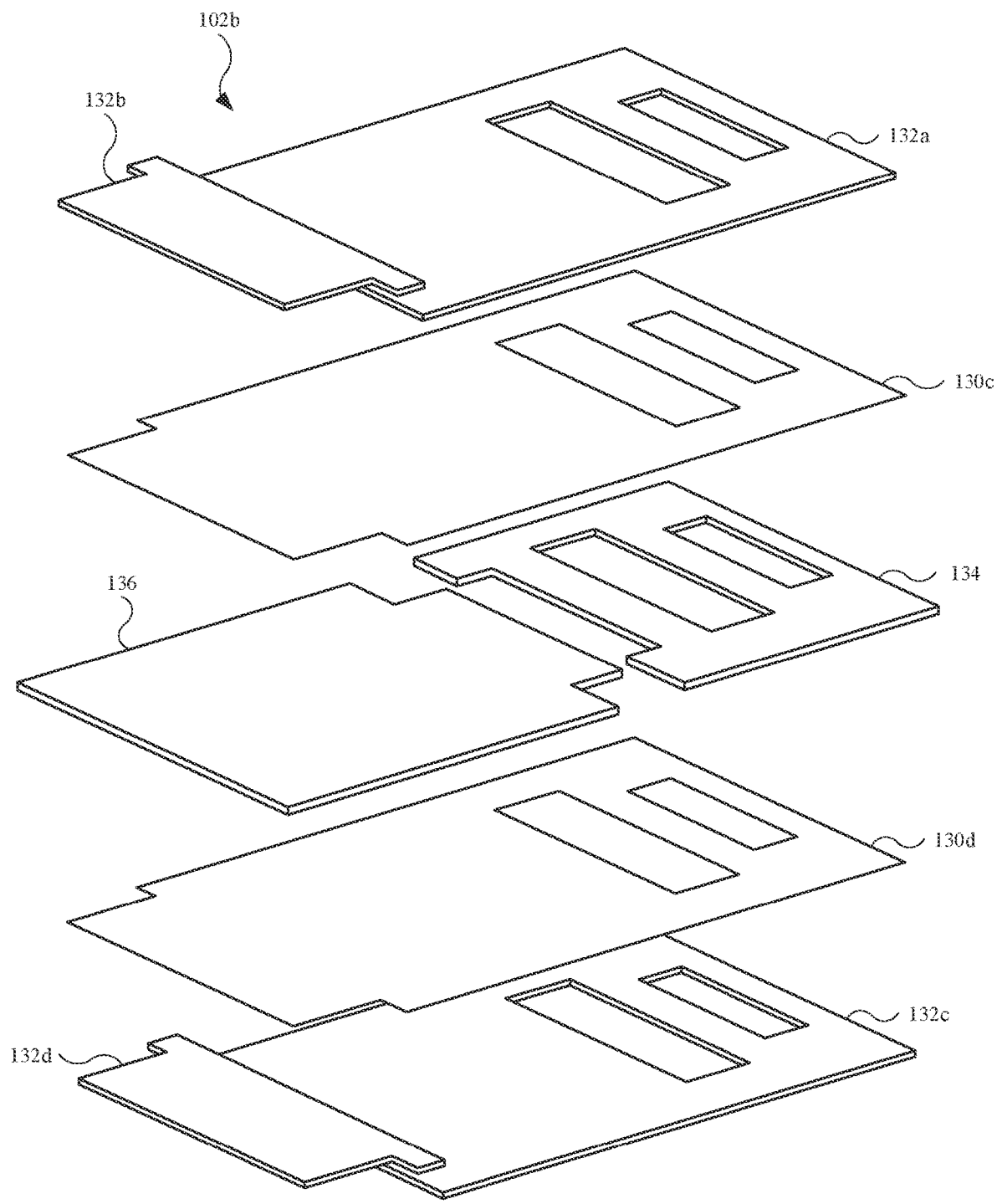
FIG. 5 illustrates an exploded view of the section (i.e., middle section) of the accessory device, showing several features of the section.

FIG. 5 illustrates an exploded view of section 102b of accessory device 100, showing several features of section 102b. As shown, section 102b includes a layer 132a, a layer 132b, a layer 132c, and a layer 132d. Layers 132a, 132b, 132c, and 132d generally define the exterior of section 102b. Layers 132a, 132b, 132c, and 132d may include aesthetic materials, such as leather, synthetic leather, or microfiber (as non-limiting layers). In some embodiments, layers 132a and 132c include microfiber, and layers 132b and 132d include leather.

Section 102b may also include relatively rigid layers, as compared to layers 132a, 132b, 132c and 132d. For example, section 102b may include a structural layer 134, or filler, designed to provide structural support. Structural layer 134 may include a flexible but durable material, such as TPU, as a non-limiting example. Further, section 102b may include a shunt 136 formed from a metal or other material designed to absorb a magnetic field from, for example, a portable electronic device or magnet 116 (shown in FIG. 2). As a result, shunt 136 can protect personal items, such as credit cards and hotel cards, from damage. As shown, structural layer 134 includes a cut out (not labeled) with a size and shape corresponding to a region of shunt 136. In this manner, structural layer 134 and shunt 136 may be co-planar when assembled. In order to secure structural layer 134 and shunt 136, section 102b includes an adhesive layer 130c to secure structural layer 134 and shunt 136 to layers 132a and 132b, and an adhesive layer 130d to secure structural layer 134 and shunt 136 to layers 132c and 132d. It should be noted that several layers include openings, and thus define, in part, openings 108a and 108b (shown in FIG. 1).

Figure 6:
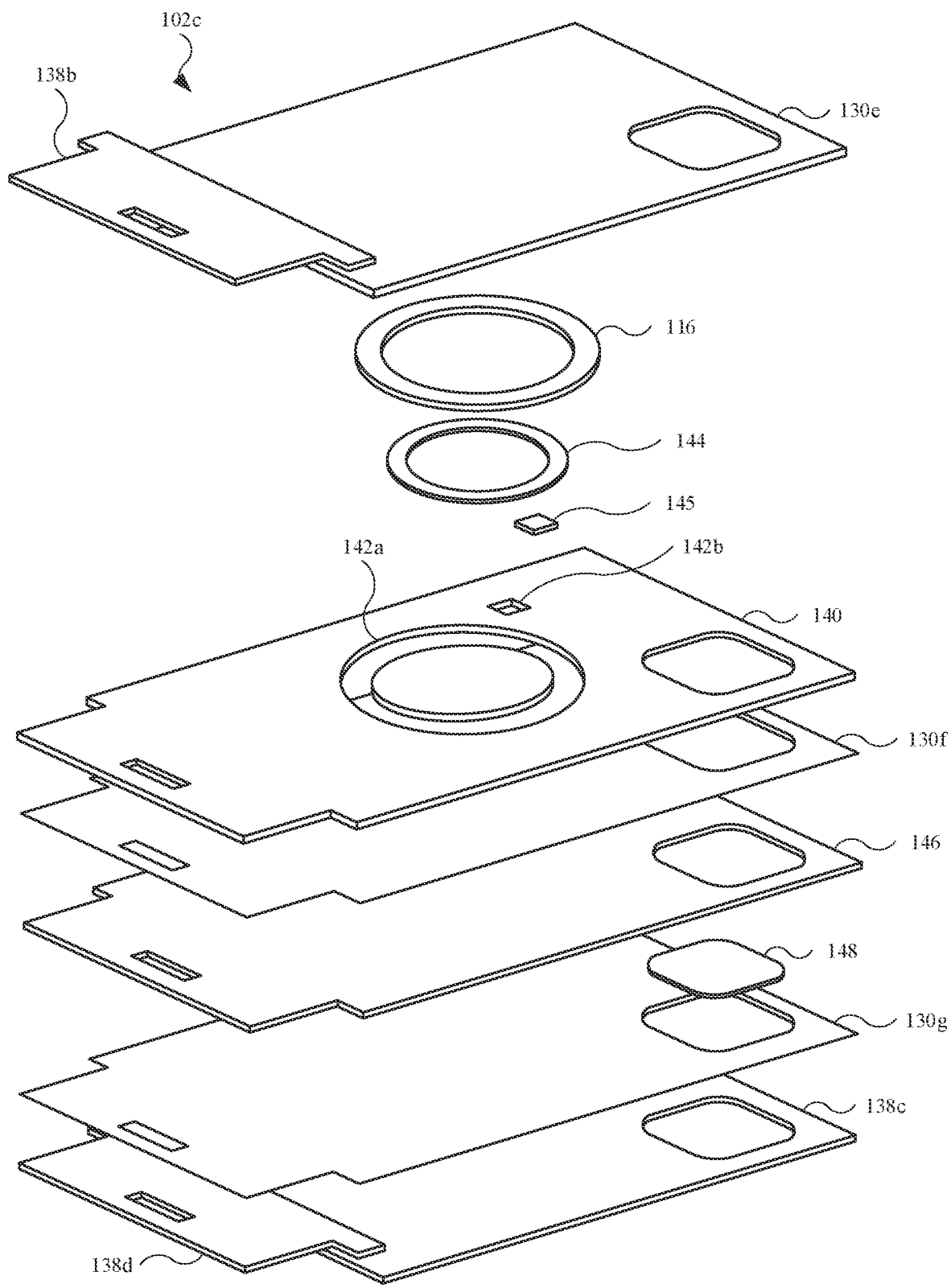
FIG. 6 illustrates an exploded view of the section (i.e., bottom section) of the accessory device, showing several features of the section.

FIG. 6 illustrates an exploded view of section 102c of accessory device 100, showing several features of section 102c. As shown, section 102b includes a layer 138a, a layer 138b, a layer 138c, and a layer 138d. Layers 138a, 138b, 138c, and 138d generally define the exterior of section 102c. Layers 138a, 138b, 138c, and 138d may include aesthetic materials, such as leather, synthetic leather, or microfiber (as non-limiting layers). In some embodiments, layers 138a and 138c include microfiber, and layers 138b and 138d include leather.

Section 102c may also include relatively rigid layers, as compared to layers 138a, 138b, 138c and 138d. For example, section 102c may include a structural layer 140 (also referred to as a stiffening layer or a filler) designed to provide structural support. Structural layer 140 may include a flexible but durable material, such as TPU, as a non-limiting example. Further, structural layer 140 may include several variations, which will be shown and described below. Moreover, structural layer 140 may represent an assembly of two or more layers. As shown, structural layer 140 may include several openings, such as an opening 142a. Opening 142a is designed to receive magnet 116 as well as a wireless communication circuit 144. Structural layer 140 may include a thickness equal to or greater than that of the combination of magnet 116, and may include a thickness equal to or greater than that of wireless communication circuit 144.

In additional to magnetically coupling with, and aligning, an external inductive charging mechanism, magnet 116 can be used as a triggering magnet that initiates an information transfer, or read, event of wireless communication circuit 144 by the portable electronic device. In this regard, magnet 116 can generate a unique magnetic field vector that can be detected by a portable electronic device (not shown in FIG. 6). Moreover, the unique magnetic field vector can be distinguished, by the portable electronic device, from other magnets. As a result, accessory device 100, which carries magnet 116, can be uniquely identified by a portable electronic device. As an optional alternative, structural layer 140 may include an opening 142b that receives a magnet 145 used as a triggering magnet.

Wireless communication circuit 144 may include a near-field communication ("NFC") circuit, as a non-limiting exemplary circuit. Wireless communication circuit 144 is designed to transmit information to the portable electronic device. For example, wireless communication circuit 144 may transmit information related to accessory device 100, such as a serial number or a code used by the electronic device to identify accessory device 100 and subsequently obtain information related to accessory device 100, such as the size, shape, and/or location of openings 108a and 108b (shown in FIG. 1). In this manner, when the portable electronic device is positioned in accessory device 100, the portable electronic device can present visual information on the display in a location corresponding the location of opening 108a. Furthermore, due in part to the portable electronic device having information related to the size, shape and location of opening 108a, the portable electronic device can present visual information on the display that is within a perimeter defined by opening 108a. Also, the portable electronic device, having information related to the size, shape, and location of opening 108b, can determine which input and output mechanisms (e.g., camera(s), sensor(s), and/or audio speaker(s)) can be used while the portable electronic device is positioned in accessory device 100. In other words, the portable electronic device can determine whether any input and output mechanisms are covered by accessory device 100.

Section 102c may further include a capping layer 146, or cap, designed to provide additional support and rigidity to structural layer 140. Further, section 102c may include a reinforcement layer 148 designed to provide additional support to protrusion 114 (shown in FIG. 2). Further, in order to secure structural layer 140 (and features positioned with openings 142a and 142b of structural layer 140), section 102b includes an adhesive layer 130e to secure structural layer 140 to layers 138a and 138b. Also, an adhesive layer 130f can secure structural layer 140 to capping layer 146. Further, an adhesive layer 130g can secure capping layer 146 to layers 138c and 138d, as well as to reinforcement layer 148. It should be noted that several layers include openings and protruding features, and thus define opening 111 (shown in FIG. 1) and protrusion 114 (shown in FIG. 2), respectively.

Figure 7:
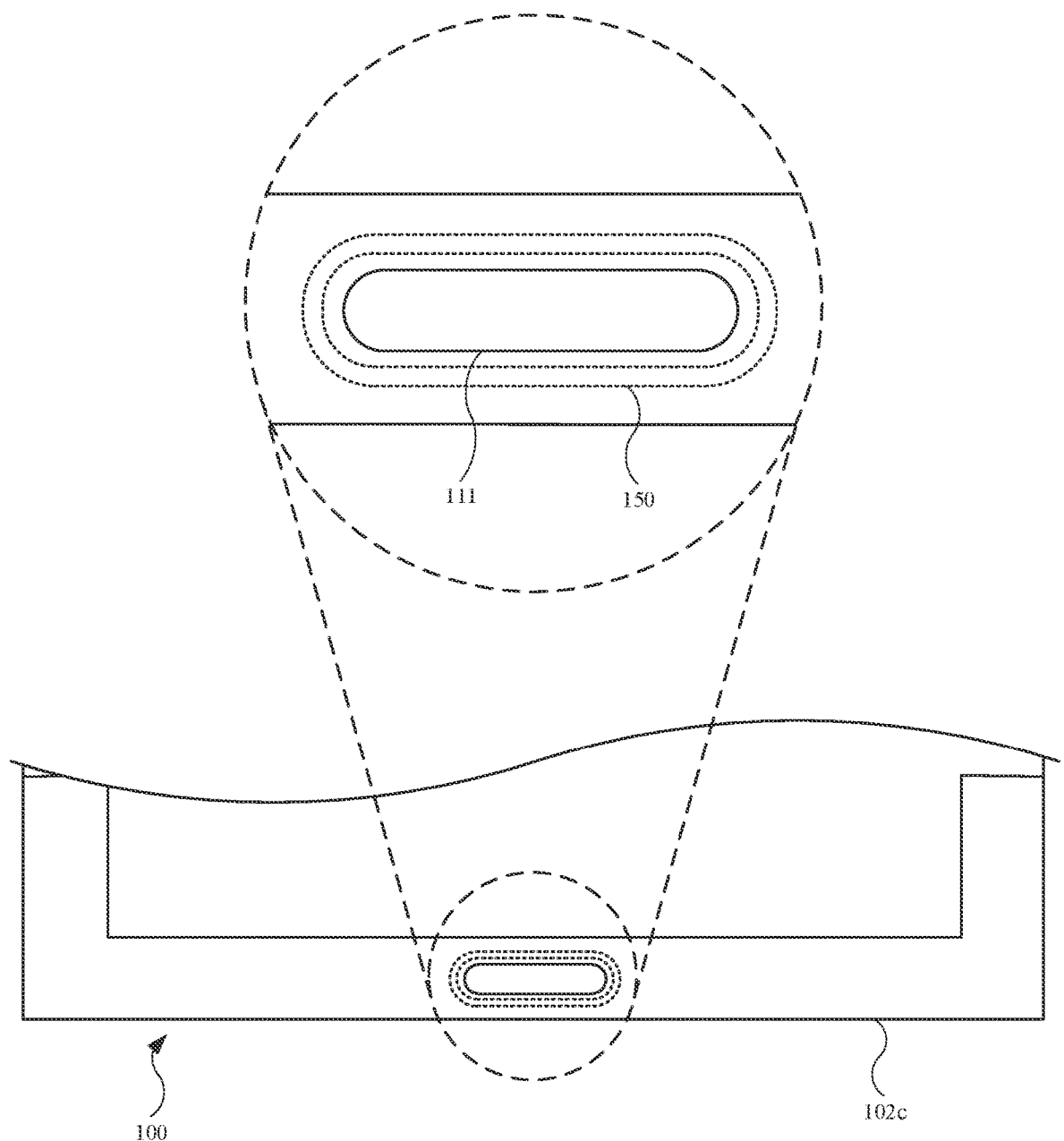
FIG. 7 illustrates a plan view of the accessory device, showing a reinforcement feature surrounding the opening.

FIG. 7 illustrates a plan view of accessory device 100, showing a reinforcement feature 150 surrounding opening 111. As shown in the enlarged view, reinforcement feature 150 is embedded in section 102c and is positioned around a perimeter of opening 111. Reinforcement feature 150 is designed to protect section 102c against breaking or ripping at, or near, opening 111 when a force is applied to opening 111. For example, when strap 110 is secured with accessory device 100 using opening 111, a user may pull on strap 110, thereby causing a force to opening 111 capable of tearing section 102c. However, reinforcement feature 150 can protect the integrity of opening 111 against such a force.

In some embodiments, reinforcement feature 150 includes a strand of material wrapped/looped several times around opening 111. Further, in some embodiments, reinforcement feature 150 is integrated with section 102c. For example, reinforcement feature 150 may be integrated with structural layer 140 (shown in FIG. 6) by a lamination process. Also, in some embodiments, reinforcement feature 150 is formed from a synthetic fiber spun from liquid-crystal polymer. Other materials are possible. For instance, in some embodiments, reinforcement feature 150 is formed from a metal ring.

Figure 8:
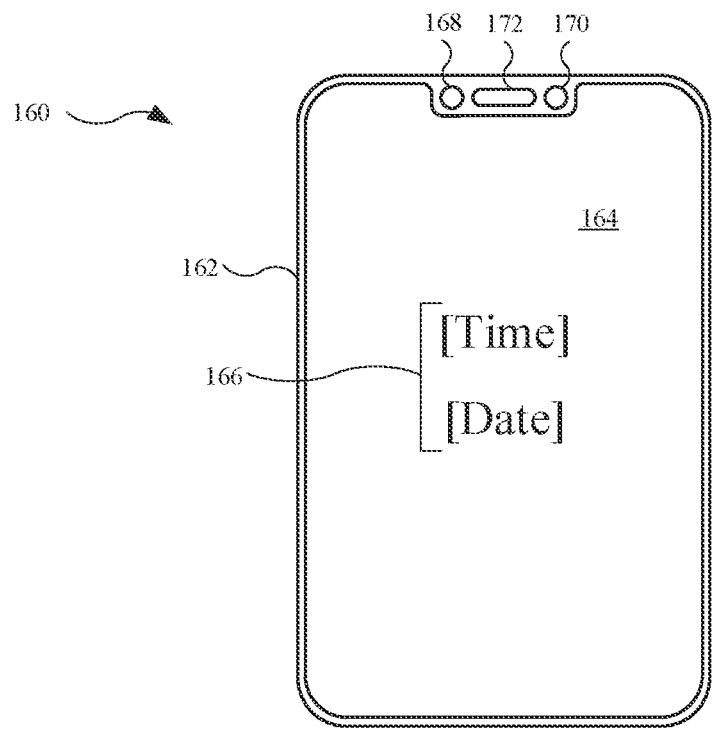
FIG. 8 illustrates a plan view of an electronic device suitable for use with accessory devices described herein.
Figure 9:
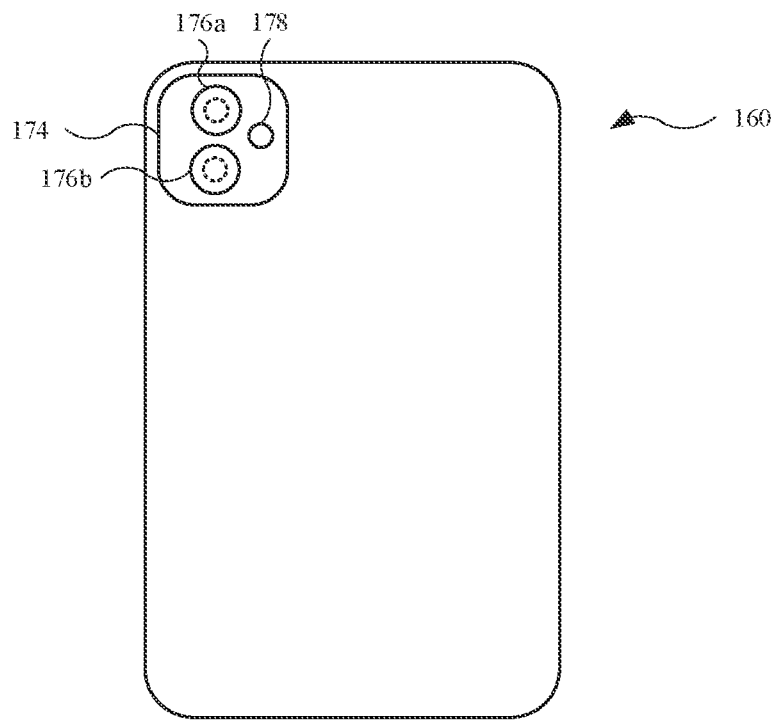
FIG. 9 illustrates an alternate plan view of an electronic device shown in FIG. 8, showing additional features of the electronic device.

Accessory device 100, and other accessory devices described herein, are designed for use with portable electronic devices. FIGS. 8 and 9 show and describe an electronic device 160 with which accessory device 100 can be used.

FIG. 8 illustrates a plan view of electronic device 160 suitable for use with accessory devices described herein. Electronic device 160 may include a smartphone or a tablet computing device, as non-limiting examples. As shown, electronic device 160 includes a housing 162, or enclosure, and a display 164 coupled with housing 162. Display 164, which may include a display commonly known in the art for mobile device displays, is designed to present visual information 166. As shown, visual information 166 includes date and time information. However, visual information 166 may include a variety of other textual information, as well as still images and/or motion (video) images.

Additionally, electronic device 160 may include a camera 168 designed to capture images that are external to electronic device 160. Electronic device 160 may further include a light sensor 170 designed to detect and determine light intensity, and provide light intensity to processing circuitry (not shown in FIG. 8) of electronic device 160, which can be used to, for example, determine whether display 164 is covered and subsequently whether to deactivate display 164. Also, electronic device 160 may include an audio speaker 172 designed to emit acoustical energy in the form of audible sound. Camera 168, light sensor 170, and audio speaker 172 are exemplary input and output mechanisms of electronic device, and the number (and order/position) of these mechanisms may vary in other embodiments.

FIG. 9 illustrates an alternate plan view of electronic device 160 shown in FIG. 8, showing additional features of electronic device 160. The back/rear side of electronic device 160 is shown. At this location, electronic device 160 may include a protruding feature 174 in which several features are located. For instance, at protruding feature 174, electronic device 160 may include a camera 176a and camera 176b. Although cameras 176a and 176b are shown, the number of cameras may vary. Additionally, electronic device 160 may include light source 178, which may include a flash light source, that provides additional light during an image capturing event by camera 176a or camera 176b.

Figure 10:
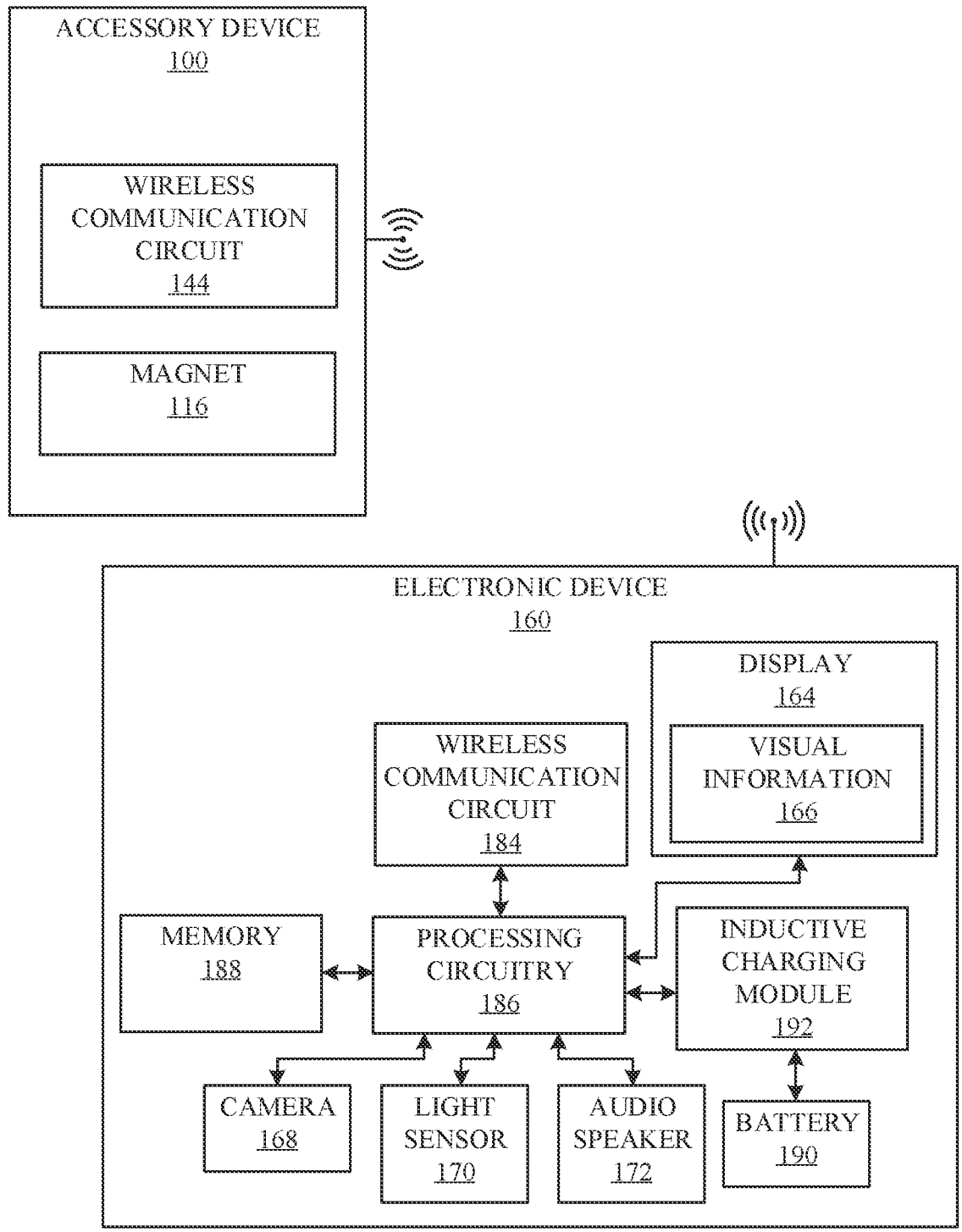
FIG. 10 illustrates a schematic view of the accessory device and the electronic device, in accordance with some described embodiments.

FIG. 10 illustrates a schematic view of accessory device 100 and electronic device 160, in accordance with some described embodiments. Accessory device 100, as well as other accessory devices described herein, includes features designed to communicate and provide information to electronic device 160. For example, accessory device 100 includes wireless communication circuit 144 that can transmit information to electronic device 160. The information transmitted by wireless communication circuit 144 may include, for example, a serial number or model number that defines a unique identifier of accessory device 100. As a result, electronic device 160 can determine the size, shape, and location of the openings (e.g., openings 108a and 108b, shown in FIG. 1) of accessory device 100, as well as the thickness and material makeup of section 102c (shown in FIG. 1) of accessory device 100. Alternatively, the information transmitted by wireless communication circuit 144 may include the information related to the size, shape, and location of the openings (e.g., openings 108a and 108b) of accessory device 100, as well as the thickness and material makeup of section 102c of accessory device 100. In other words, the identifier information may not be required when the characteristics of accessory device 100 are directly transmitted.

The information transmitted by wireless communication circuit 144 can be received by wireless communication circuit 184 located in electronic device 160. In some embodiments, wireless communication circuit 144 and wireless communication circuit 184 each include NFC circuitry, which includes memory and an antenna for transmission/receiving capabilities of information stored on the memory. In some embodiments (not shown in FIG. 10), accessory device 100 includes a memory circuit that stores the aforementioned information, and is accessible by wireless communication circuit 144. Wireless communication circuit 144 and wireless communication circuit 184 may each represent other forms of communication circuitry, such as BLUETOOTH® circuitry.

When accessory device 100 and electronic device 160 are within sufficient proximity to each other (e.g., when electronic device 160 is positioned/disposed within accessory device 100), wireless communication circuit 144 and wireless communication circuit 184 can exchange information through an authentication protocol, or "handshake," to determine whether accessory device 100 can transmit information to electronic device 160. Subsequent confirming authentication, wireless communication circuit 144 can transmit the aforementioned information related to accessory device 100. Wireless communication circuit 184 can provide the information to processing circuitry 186 (representing at central processing unit, or CPU, and graphics processing unit, or GPU) of electronic device 160.

Processing circuitry 186 can access memory 188 of electronic device 160 and find the identification information on a look-up table, for example, associated with various accessory devices. Once the identification is matched with accessory device 100, processing circuitry 186 can subsequently receive characteristics and features (stored on memory 188) of accessory device 100. Alternatively, processing circuitry 186 can send the identification information to a remote location, such as a server (including a cloud-based storage network) to retrieve information related to accessory device 100. Also, in some embodiments, wireless communication circuit 184 of electronic device 160 receives, directly from wireless communication circuit 144, information related to the size, shape, and location of the openings (e.g., openings 108a and 108b, shown in FIG. 1), and the thickness and material makeup of section 102c (shown in FIG. 1) of accessory device 100, and accordingly.

When processing circuitry 186 determines the characteristics and features of accessory device 100, electronic device 160 can operate in a manner consistent with the characteristics and features of accessory device 100. For example, processing circuitry 186 can receive information related to opening 108a (shown in FIG. 1), including the size, shape, and location of opening 108a. As a result, processing circuitry 186 can instruct display 164 to present visual information 166 in a location corresponding to opening 108a, as the remaining region of display 164 may be covered by accessory device 100. Moreover, the instructions provided by processing circuitry 186 can prompt display 164 to change the size of visual information 166 (e.g., smaller font size) to ensure visual information 166 is fully viewable through opening 108a and not obstructed by accessory device 100. This will be exemplified below.

Electronic device 160 can modify additional operations when electronic device 160 determines/identifies accessory device 100, including characteristics and features of accessory device 100. For example, once accessory device 100 is identified by electronic device 160, electronic device 160 receives information that accessory device 100 includes magnet 116. Moreover, electronic device 160 receives information related to thickness and material(s) that define section 102c (shown in FIG. 2) of accessory device 100. In this manner, during a wireless (inductive) charging event, processing circuitry 186 can more reliably and accurately estimate the charging time for an inductive charging module 192 (that includes an inductive receiving coil) of electronic device 160 to complete a charge of a battery 190 of electronic device 160. As a result, the user does not need to remove electronic device 160 from accessory device 100 to perform a wireless charge of battery 190, and can receive, from electronic device 160, reliable estimated time to charge battery 190.

Additionally, electronic device 160 can also determine/identify opening 108b (shown in FIG. 1), including the size, shape, and location of opening 108b. As a result, processing circuitry 186 can determine whether camera 168, light sensor 170, and/or audio speaker 172 are uncovered/unobstructed by accessory device 100, based characteristics of opening 108b, and subsequently maintain camera 168, light sensor 170, and/or audio speaker 172 in an active/operational mode (when uncovered by accessory device 100) or in an inactive mode (when covered by accessory device 100). Accordingly, the transmission of information by accessory device 100 to electronic device 160 allows for considerable functionality of electronic device 160 even when electronic device 160 is positioned/disposed in accessory device 100.

Figure 11:
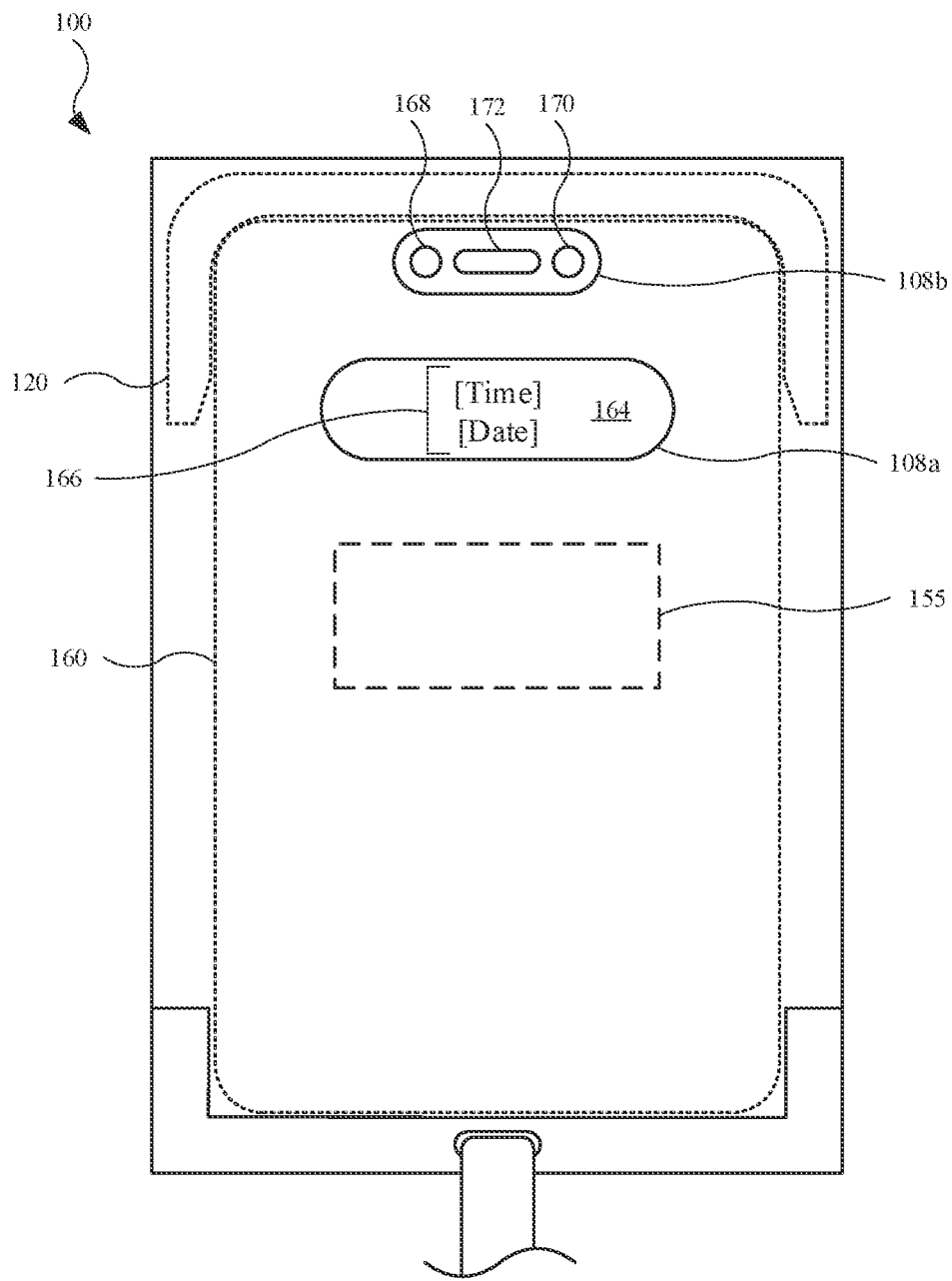
FIG. 11 illustrates a plan view of the electronic device positioned within the accessory device.

FIG. 11 illustrates a plan view of electronic device 160 positioned within accessory device 100. In this exemplary illustration, it should be noted that electronic device 160 and accessory device 100 have completed authentication and transmitted/received information through their respective wireless communication circuitry, shown and described in FIG. 10. In this regard, electronic device 160 can operate in accordance with information related to accessory device 100. For example, visual information 166 presented on display 164 can be adjusted, i.e., relocated (i.e., presented via different pixels of display 164) from an original position on display 164, shown in FIG. 8 (represented by a box 155 in FIG. 11), to a location corresponding to opening 108a of accessory device 100. Moreover, if needed, visual information 166 can further adjusted to fit within a perimeter defined by opening 108a. For example, when visual information 166 includes textual information, the font size of the textual information can be reduced such that visual information 166 is fully within the perimeter of opening 108a. Additionally, electronic device 160 can maintain camera 168, light sensor 170, and audio speaker 172 in an active/operational mode, as these devices are rendered uncovered by accessory device 100 based on opening 108b.

While electronic device 160 obtains information related to openings 108a and 108b, electronic device 160 should be positioned/disposed in accessory device 100 in a consistent manner to ensure, for example, visual information 166 is consistently within the perimeter of opening 108a. In this regard, accessory device 100 can rely upon additional structural components to ensure alignment consistency. For example, accessory device 100 includes collar 120 (also shown in FIG. 3) that wraps around multiple sides of electronic device 160. When electronic device 160 is inserted into accessory device 100 and engaged with collar 120 (or at least aligned within accessory device 100 based on collar 120), electronic device 160 can consistently and reliably present visual information 166 within the perimeter of opening 108a, while camera 168, light sensor 170, and audio speaker 172 are also positioned consistently and reliably within the perimeter of opening 108b.

Figure 12:
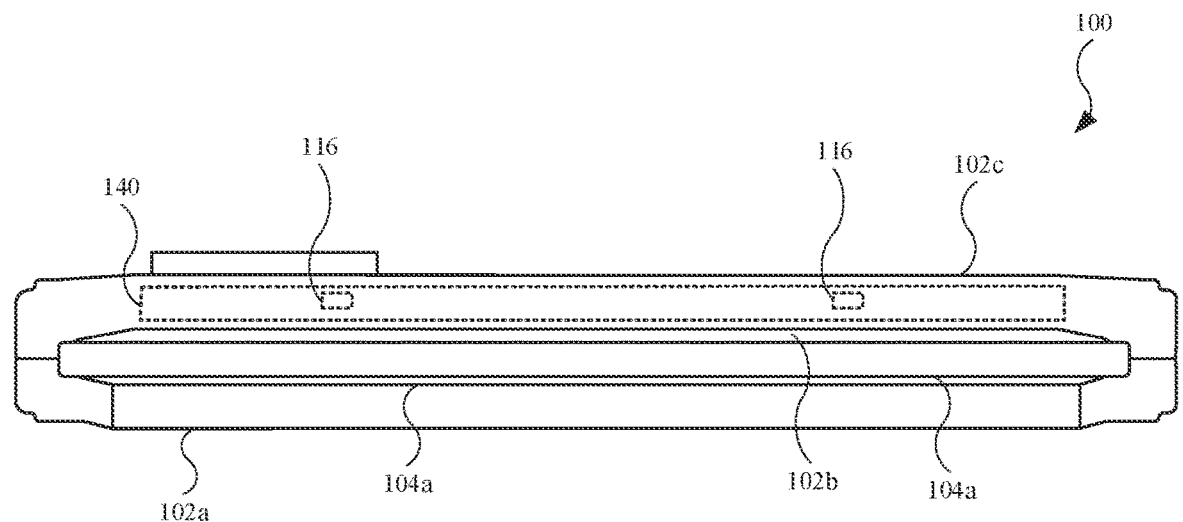
FIG. 12 illustrates a side view of the accessory device.

FIG. 12 illustrates a side view of accessory device 100. As shown, accessory device 100 is oriented upside down. Sections 102a and 102b combine to define pocket 104a, while sections 102b and 102c combine to define pocket 104b. Also, structural layer 140 is shown embedded in section 102c, with magnet 116 (shown as a cross section) embedded in structural layer 140.

Figure 13:
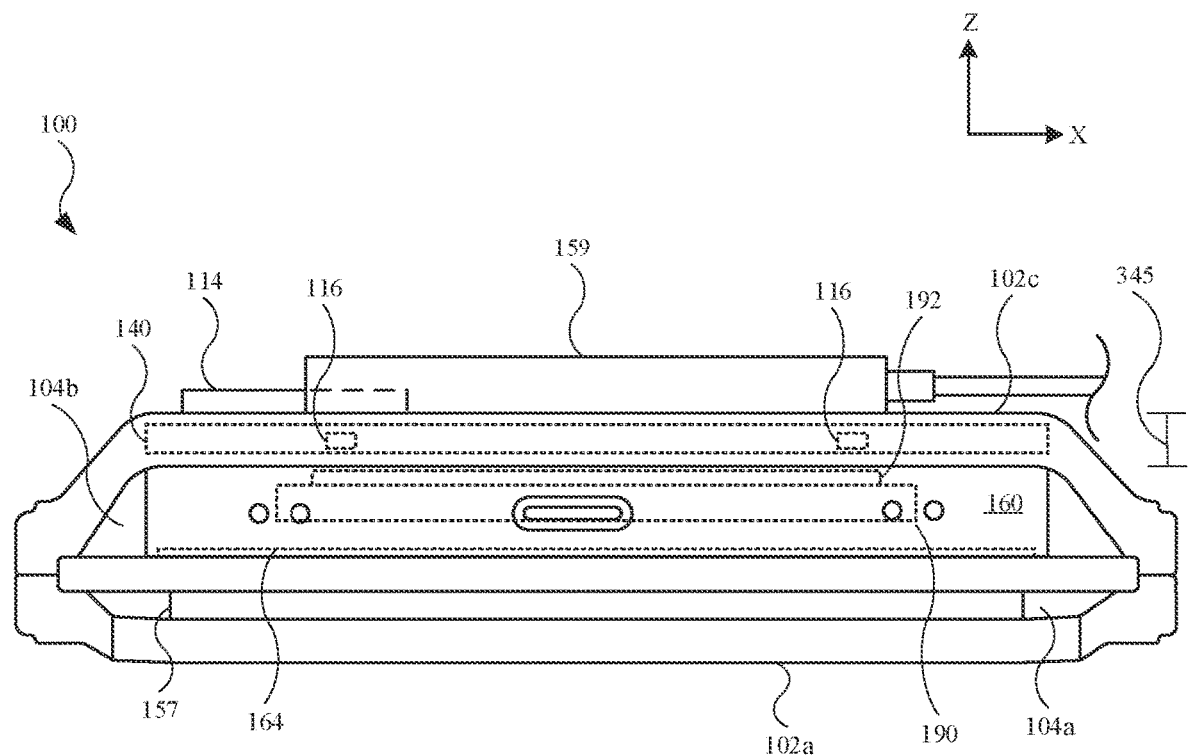
FIG. 13 illustrates a side view of the accessory device shown in FIG. 12, showing the accessory device carrying several objects.

Accessory device 100 is designed to receive multiple items. For example, FIG. 13 illustrates a side view of accessory device 100 shown in FIG. 12, showing accessory device 100 carrying several objects. For example, accessory device 100 can carry an object 157 (representing one or more items, such as credit cards, hotel cards, cash, etc.) in pocket 104a, as well as electronic device 160 in pocket 104b. Also, in order to receive object 157, sections 102a and 102b can be moved apart to increase the volume defined by pocket 104a, and sections 102b and 102c can be moved apart to increase the volume defined by pocket 104b. Regarding the latter, when section 102c is stretched, expanded, or otherwise displaced by the insertion of electronic device 160 into pocket 104b, structural layer 140 is designed to maintain section 102c in a flat/planar manner. For example, as shown, section 102c is flat, having an inner and outer surfaces that are generally parallel with respect to a back surface of electronic device 160, with the "back surface" referring to a surface opposite display 164 of electronic device 160. Also, the inner surface of section 102c can engage the back surface of electronic device 160. Moreover, both structural layer 140 and capping layer 146 (shown in FIG. 6) can be parallel with respect to section 102b when electronic device 160 is positioned in pocket 104b.

By maintaining section 102c in a flat/planar configuration, the likelihood of gaps or spaces between section 102c and electronic device 160 is significantly decreased. For example, as shown in FIG. 13, the back surface of electronic device 160 engages an inner surface section 102c such that virtually no space or gap exists between electronic device 160 and section 102c. As a result, when an inductive charging mechanism 159 (used to charge battery 190 of electronic device 160) is placed on section 102c, inductive charging mechanism 159 is separated from electronic device 160 only by a dimension 345, related to a thickness of section 102c, and the charging efficiency increases as relatively little or no air gaps exist between inductive charging mechanism 159 and electronic device 160. Also, the desired flat/planar configuration of section 102c is further supported by protrusion 114 that extends from section 102c, as protrusion 114 can receive protruding feature 174 (shown in FIG. 9) of electronic device 160.

To further increase charging efficiency, magnet 116 is embedded in structural layer 140 in a location corresponding to the location of inductive charging module 192 of electronic device 160. In this manner, an inductive transmitting coil of inductive charging mechanism 159 is positioned directly over, or aligned along the Z-axis (of Cartesian coordinates), with respect to an inductive receiving coil of inductive charging module 192. As a result, the induced magnetic field provided by inductive charging mechanism 159 is received by inductive charging module 192 as directly as possible while electronic device 160 is positioned in accessory device 100.

FIGS. 14-17 show and describe additional modifications and/or alternate features of a structural layer can be embedded in section 102c of accessory device 100. In other words, the structural layers shown and described in FIGS. 14-17 can substitute or modify structural layer 140 and capping layer 146 (both shown in FIG. 6), while also providing similar or enhanced benefits to accessory device 100.

Figure 14:
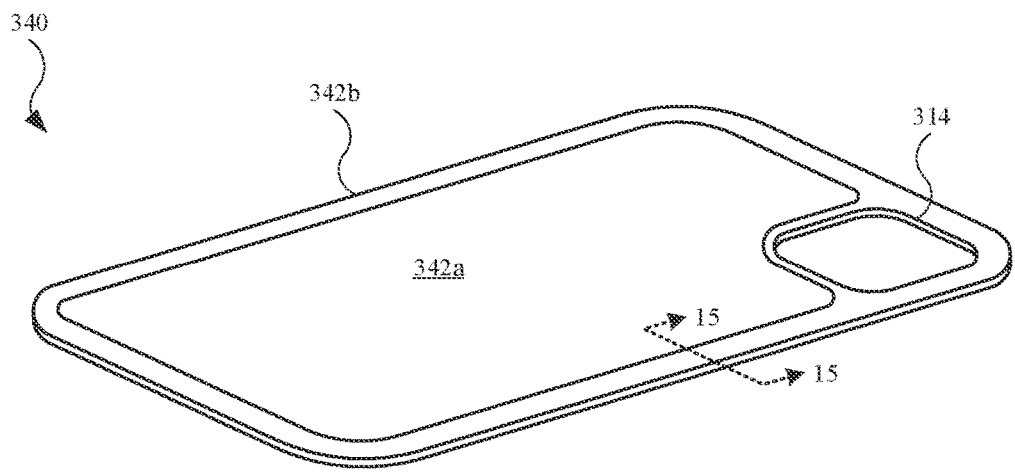
FIG. 14 illustrates an isometric view of an alternate embodiment of a structural layer, showing the structural layer having multiple materials.

FIG. 14 illustrates an isometric view of an alternate embodiment of a structural layer 340, showing structural layer 340 having multiple materials. As shown, structural layer 340 includes a material 342a and a material 342b that surrounds material 342a. Material 342a may include a relatively rigid material, as compared to the rigidity of material 342b. In other words, material 342a may include a hardness that is greater than the hardness of material 342b. For example, in some embodiments, material 342a includes a polycarbonate ("PC") or PC-TPU combination, and material 342b includes TPU, including a relatively soft TPU. As a result, material 342a can provide sufficient rigidity, thereby maintain section 102c (shown in FIG. 3) in a flat/planar configuration when electronic device 160 is positioned in accessory device 100 (as shown in FIG. 13), while material 342b, representing the sides or perimeter of structural layer 340, can flex or bend to some degree and still maintain some integrity of section 102c along the perimeter of section 102c. Also, material 342b can include a protruding feature 314 that defines in part protrusion 114 (shown in FIG. 2).

Figure 15:
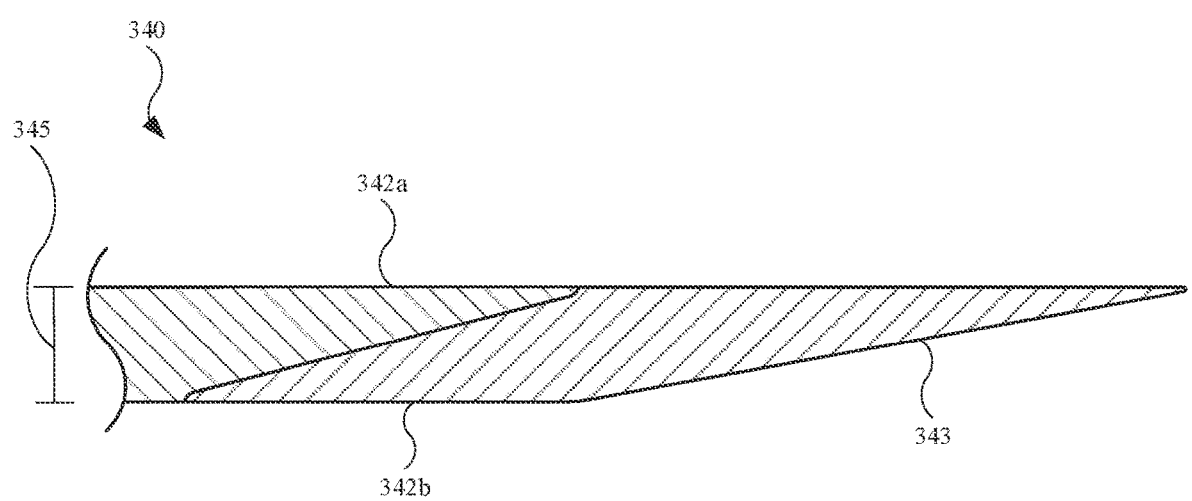
FIG. 15 illustrates a cross sectional view of the structural layer shown in FIG. 14, taken along line 15-15, showing additional features of the structural layer.

FIG. 15 illustrates a cross sectional view of the structural layer 340 shown in FIG. 14, taken along line 15-15, showing additional features of structural layer 340. As material 342a transitions to material 342b (or vice versa), structural layer 340 maintains a dimension 345, or thickness, that is consistent, despite the diagonal border defined by each of materials 342a and 342b. In some embodiments, dimension 345 is approximately in the range of 0.3 to 0.5 millimeters ("mm"). However, as material 342b extends toward an edge (and away from material 342a), material 342b decreases, based on a tapered edge 343, to a point that may be approximately in the range of 0.05 to 0.15 mm. Tapered edge 343 of material 342b may increase the overall flexibility of structural layer 340 (at a location corresponding to material 342b).

Figure 16:
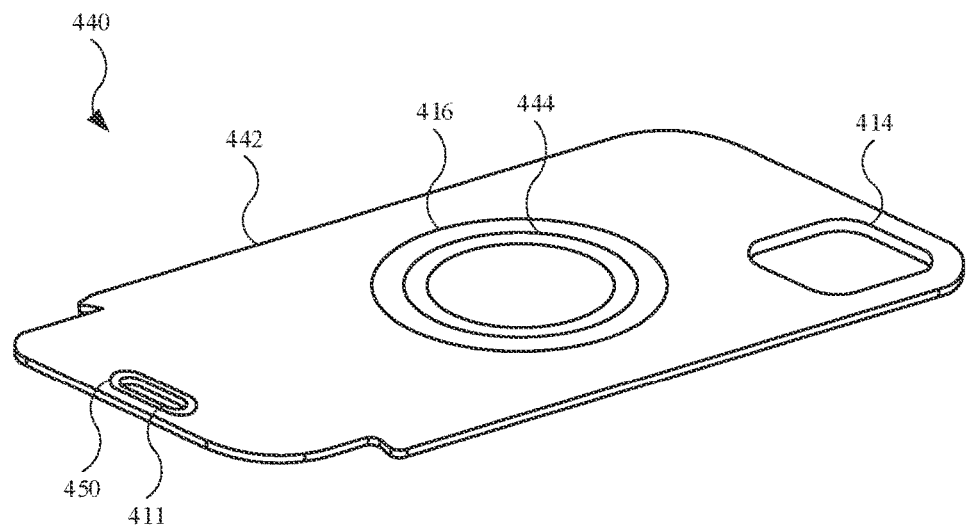
FIG. 16 illustrates an isometric view of an alternate embodiment of a structural layer, showing the structural layer having multiple embedded materials.

FIG. 16 illustrates an isometric view of an alternate embodiment of a structural layer 440, showing structural layer 440 having multiple embedded materials. As shown, structural layer 440 includes a material 442 that generally defines a base layer of structural layer 440. Material 442 may include a synthetic rubber, such as nitrile rubber ("NBR"), as a non-limiting example. In some embodiments, material 442 is formed from a moldable material. In this manner, one or more materials can be molded into material 442 by a molding operation, including compression molding. For example, structural layer 440 may include a magnet 416, a wireless communication circuit 444, and a reinforcement feature 450 molded to material 442. As a result, structural layer 440 may form a sub-assembly that reduces manufacturing times of an accessory device (not shown in FIG. 15) that integrates structural layer 440, as magnet 416 and reinforcement feature 450 are already assembled in structural layer 440. Also, in some embodiments, reinforcement feature 450 is a metal ring that surrounds an opening 411 of structural layer 440, and provides support against tearing/ripping of structural layer 440 along opening 411. Also, material 442 can include a protruding feature 414 that defines in part protrusion 114 (shown in FIG. 2).

Figure 17:
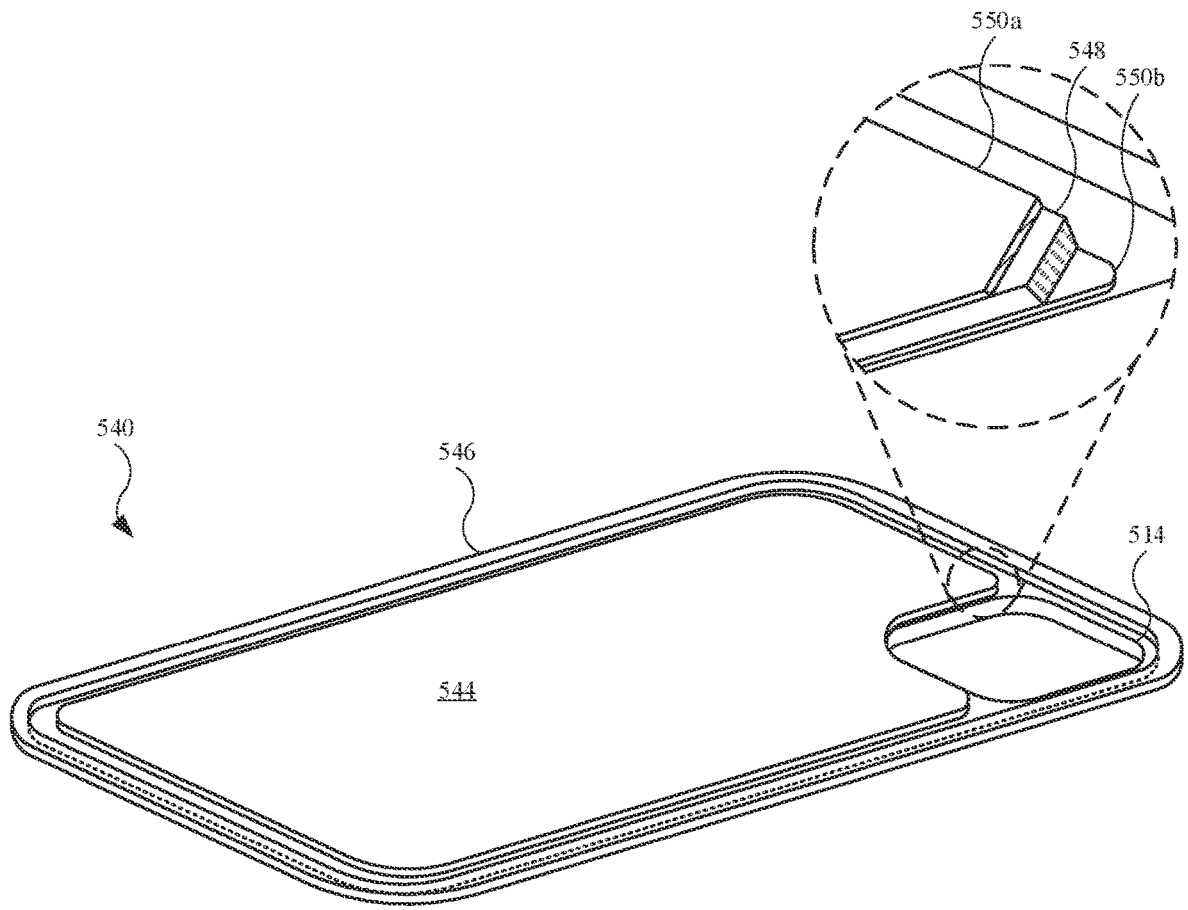
FIG. 17 illustrates an isometric view of an alternate embodiment of a structural layer, showing the structural layer having several modular sections.

FIG. 17 illustrates an isometric view of an alternate embodiment of a structural layer 540, showing the structural layer 540 having several modular sections. As shown, structural layer 540 includes an assembly 544 and a border 546 surrounding assembly 544. As shown in the enlarged view, assembly 544 may include multiple layers. For example, assembly 544 may include a central layer 548 formed from a relative rigid material, such as PC. Assembly 544 may further include a capping layer 550a and a capping layer 550b surrounding central layer 548. Border 546 may include a less rigid layer, such as TPU (as a non-limiting example). Accordingly, assembly 544 may include a hardness that is greater than the hardness of border 546. Also, structural layer 540 can include a protruding feature 514 that defines in part protrusion 114 (shown in FIG. 2). Also, although not shown, assembly 544 may include a magnet similar to prior embodiments.

Figure 18:
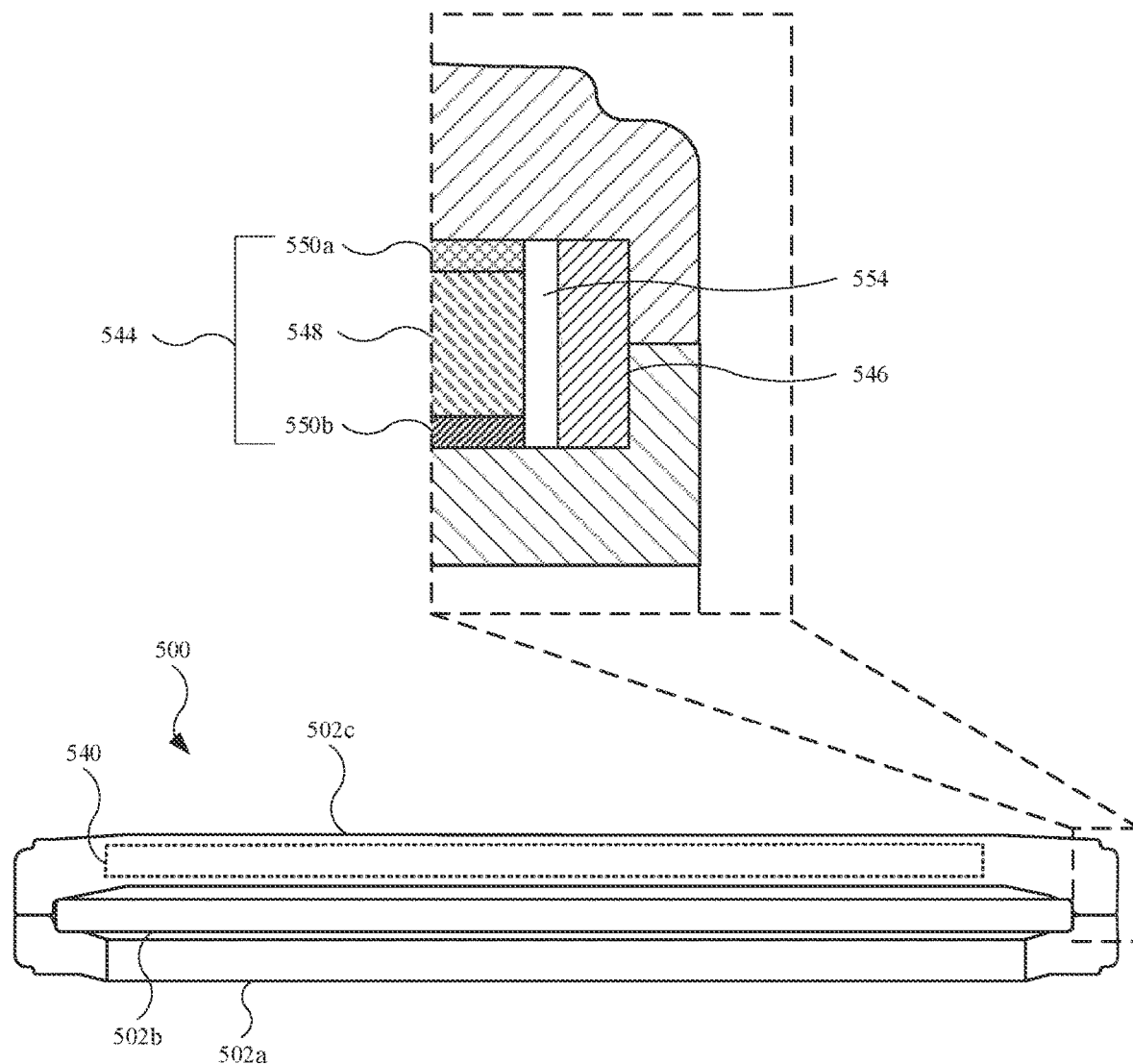
FIG. 18 illustrates a side view of an alternate embodiment of an accessory device, showing the accessory device integrating the structural layer shown in FIG. 17.

FIG. 18 illustrates a side view of an alternate embodiment of an accessory device 500, showing accessory device 500 integrating structural layer 540 shown in FIG. 17. Accessory device 500 may include several features shown and described for accessory device 100 (shown in FIG. 1). In this regard, accessory device 500 may include a section 502a, a section 502b, and a section 502c, with sections 502a, 502b, and 502c defining pockets (not labeled) of accessory device 500. Sections 502a and 502c may define a front section and a back section, respectively, of accessory device 500. As shown in the enlarged view, a partial cross sectional view of section 502c reveals several elements of structural layer 540 integrated with section 502c. As shown, assembly 544 (including central layer 548 and capping layers 550a and 550b) is integrated with section 502c. Further, border 546 is also integrated with section 502c and separated from assembly 544 by a gap 554. As a result, gap 554 further promotes relative movement between assembly 544 and border 546.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An accessory device for a portable electronic device, the accessory device comprising:
   a first section comprising an opening;
   a second section coupled with the first section, the first section and the second section defining a first pocket;
   a third section coupled with the second section, the second section and the third section defining a second pocket configured to receive the portable electronic device; and
   a wireless communication circuit configured to send information corresponding to the opening to the portable electronic device, wherein:
   in response to the portable electronic device being disposed in the second pocket, the first section covers a portion of a display of the portable electronic device and the opening defines an uncovered portion of the display.

2. The accessory device of claim 1, wherein the information further corresponds to a thickness of the third section.

3. The accessory device of claim 1, wherein the third section comprises a magnet configured to magnetically couple with an inductive charging mechanism.

4. The accessory device of claim 3, further comprising a structural layer disposed in the third section, wherein the magnet is embedded in the structural layer.

5. The accessory device of claim 4, wherein the third section maintains a planar surface, based on the structural layer, when the portable electronic device is disposed in the second pocket.

6. The accessory device of claim 1, wherein the first pocket is separate from the second pocket.

7. The accessory device of claim 1, further comprising:
   a first stitch;
   a second stitch; and
   an adhesive layer that secures the first section with the second section, wherein the first stitch, the second stitch, and the adhesive layer define the first pocket.

8. The accessory device of claim 1, further comprising a collar disposed between the second section and the third section, the collar configured to align the portable electronic device such that visual information from the portable electronic device is presented through the opening.

9. An accessory device for a portable electronic device, the accessory device comprising:
   a first section comprising an opening;
   a second section covered by the first section, the first section and the second section defining a first pocket; and
   a third section covered by the second section, the second section and the third section defining a second pocket configured to receive the portable electronic device, the second pocket separate from and the first pocket, the third section comprising:
   a magnet configured to magnetically couple with and align an inductive charging unit that charges the portable electronic device in response to the portable electronic device being disposed in the second pocket, and
   a wireless communication circuit configured to send information to the portable electronic device, the information comprising a characteristic of the third section.

10. The accessory device of claim 9, wherein the third section comprises a structural layer, and the magnet is embedded in the structural layer.

11. The accessory device of claim 10, wherein the structural layer comprises:
    a first material that defines a first hardness; and
    a second material that defines a second hardness that is less than the first hardness.

12. The accessory device of claim 11, wherein:
    the first material defines a first diagonal border,
    the second material defines a second diagonal border, and
    the first diagonal border engages the second diagonal border.

13. The accessory device of claim 12, wherein the first material comprises a first thickness, and the second material comprises a second thickness that is equal to the first thickness.

14. The accessory device of claim 9, wherein the third section comprises a protrusion configured to receive a camera of the portable electronic device.

15. An accessory device for a portable electronic device, the accessory device comprising:
    a first section comprising a first opening;
    an adhesive layer;
    a second section coupled with the first section by the adhesive layer, the first section, the second section, and the adhesive layer defining a first pocket;
    a third section covered by the second section, the second section and the third section defining a second pocket covered by the first pocket and configured to receive the portable electronic device, the third section comprising:
    a capping layer, and
    a structural layer coupled with the capping layer, wherein the third section maintains a planar section, based on the capping layer and the structural layer, when the portable electronic device is located in the second pocket, and
    a second opening; and
    a strap passing through the second opening.

16. The accessory device of claim 15, wherein the structural layer comprising:
    a first material that defines a first hardness; and
    a second material that defines a second hardness that is less than the first hardness.

17. The accessory device of claim 16, wherein the second material surrounds the first material.

18. The accessory device of claim 16, wherein the first material is separated from the second material by a gap.

19. The accessory device of claim 15, further comprising a magnet embedded in the structural layer.

20. The accessory device of claim 19, wherein the magnet comprises a flexible magnet.

* * * * *